Apr. 24, 1923.
J. F. DUGAN
1,453,042
PROCESS AND MACHINE FOR MAKING RANDS
Filed Aug. 26, 1922
7 Sheets-Sheet 2
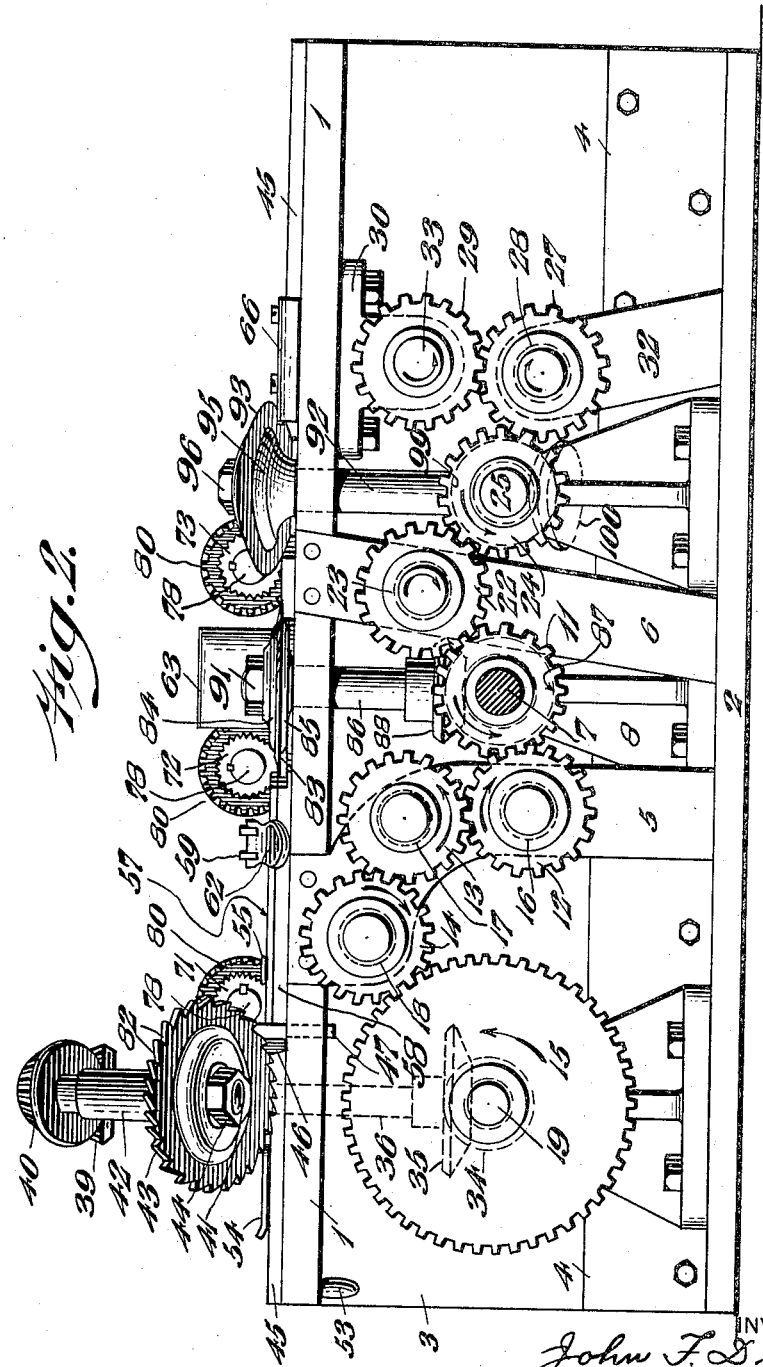
INVENTOR:
John F. Dugan.
BY
ATTORNEYS.

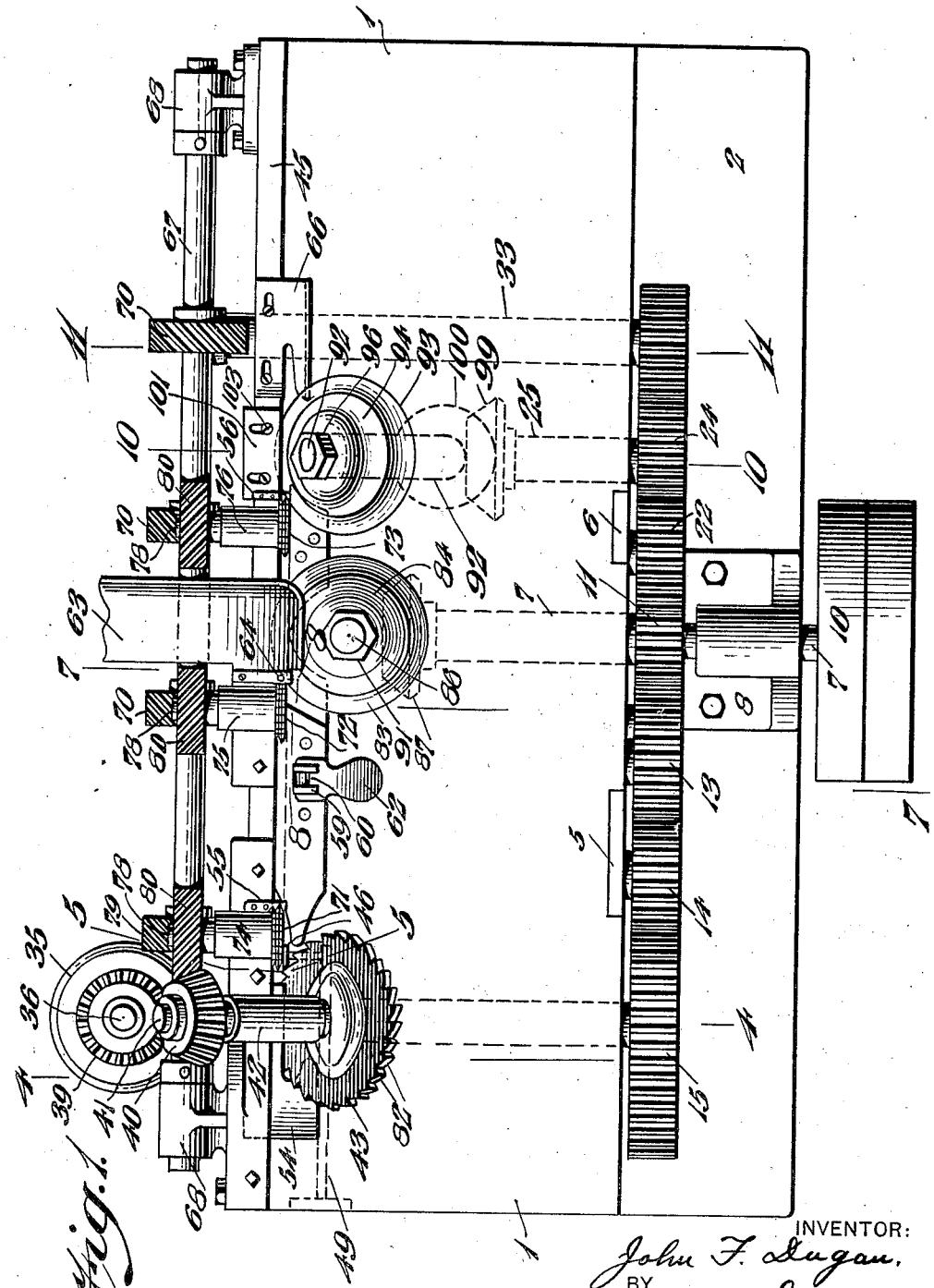

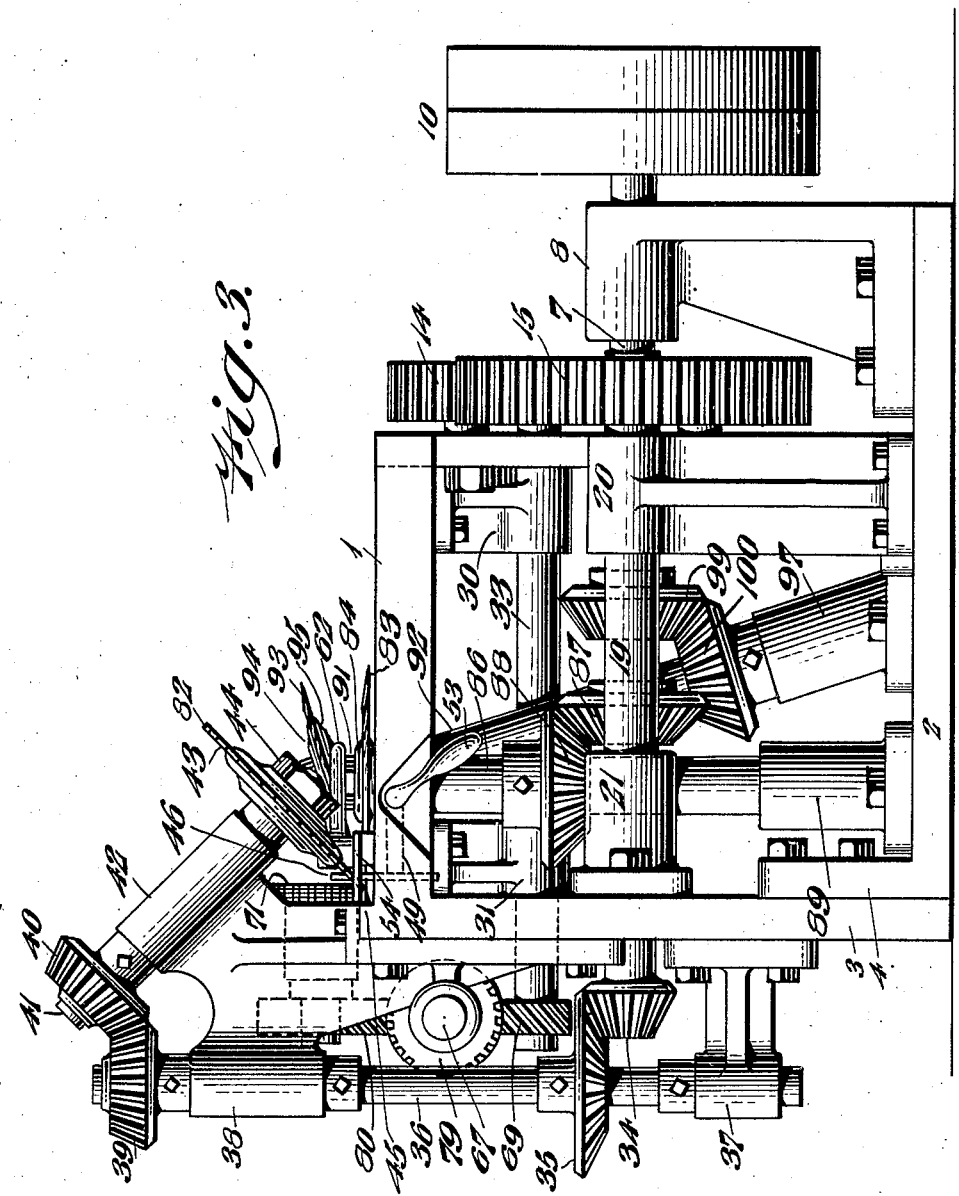

Apr. 24, 1923.
J. F. DUGAN
1,453,042
PROCESS AND MACHINE FOR MAKING RANDS
Filed Aug. 26, 1922
7 Sheets-Sheet 4
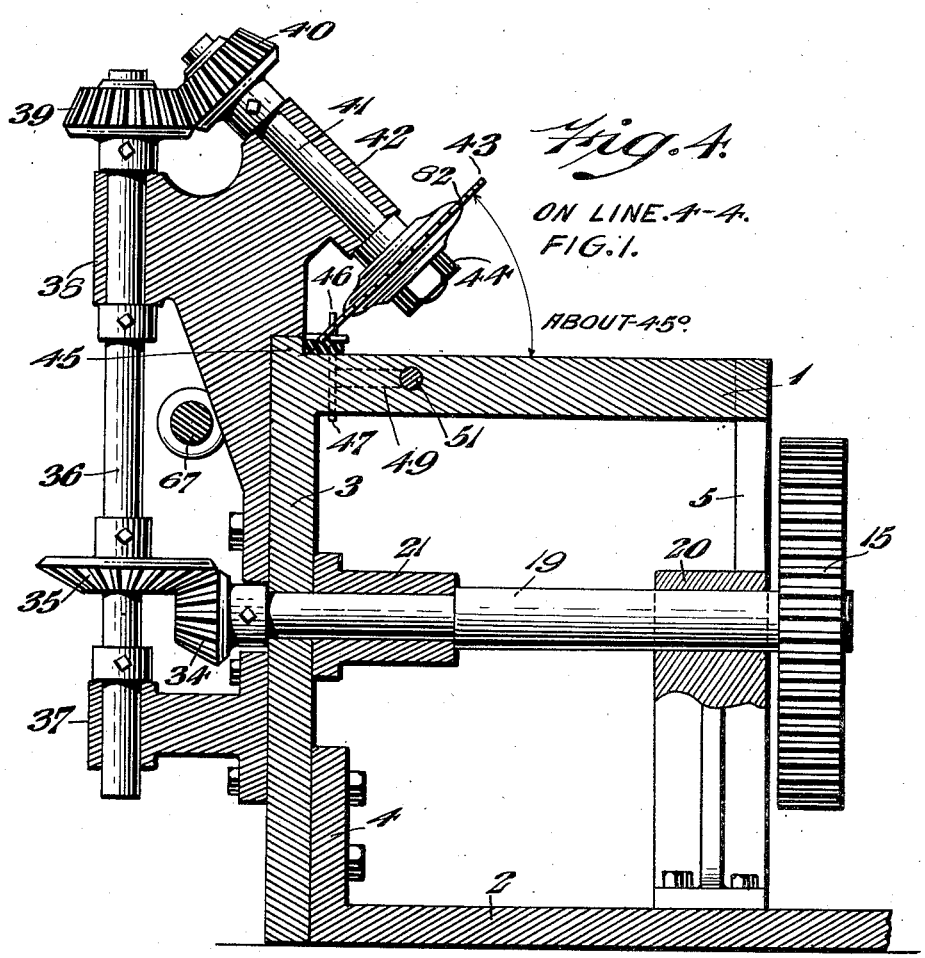
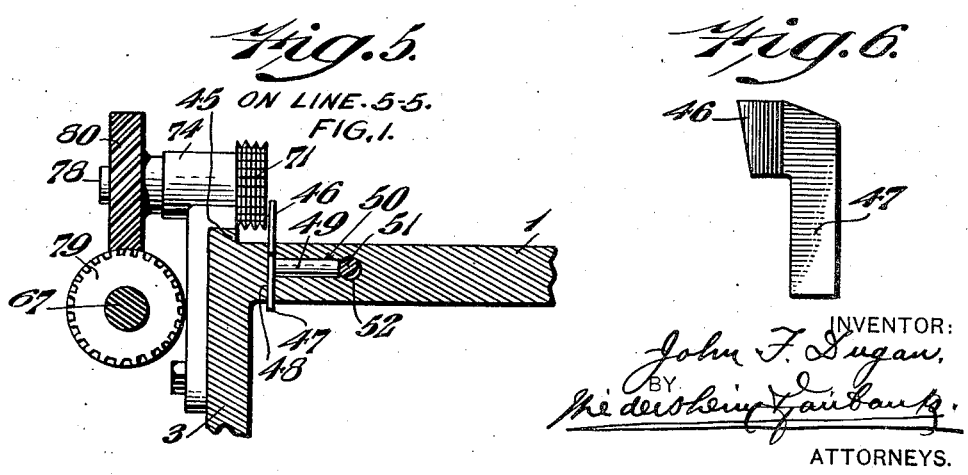
INVENTOR:
John F. Dugan,
BY
ATTORNEYS.

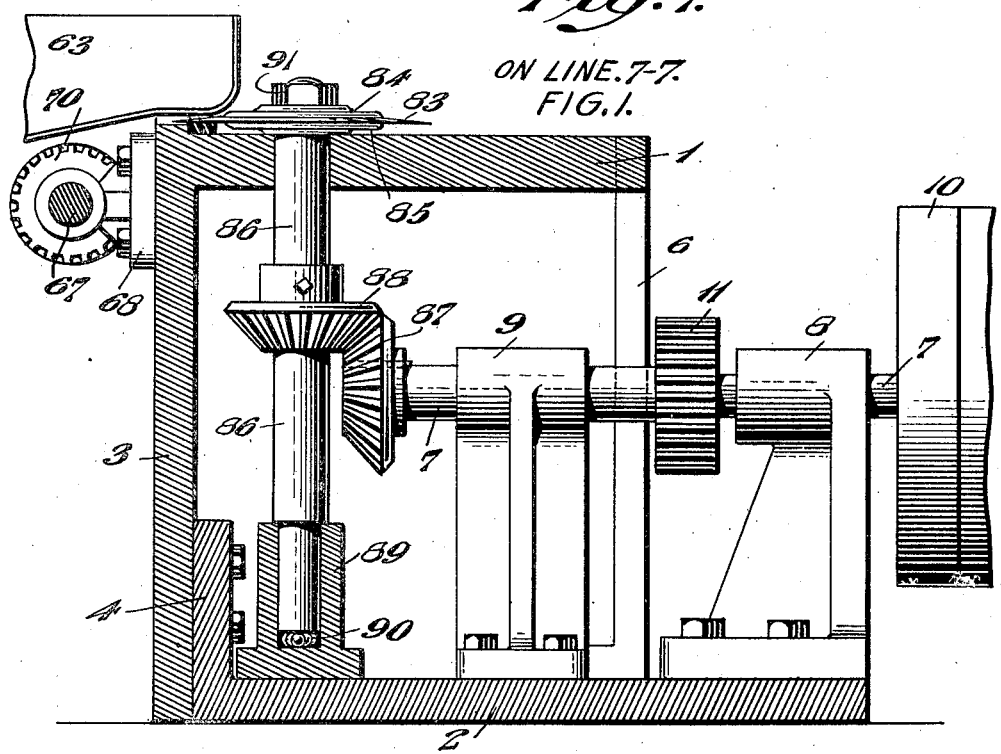
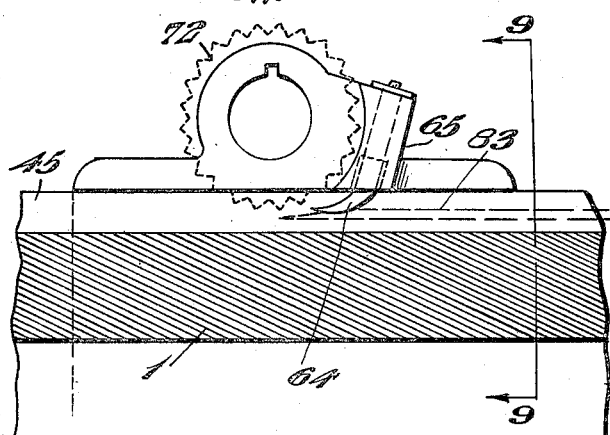
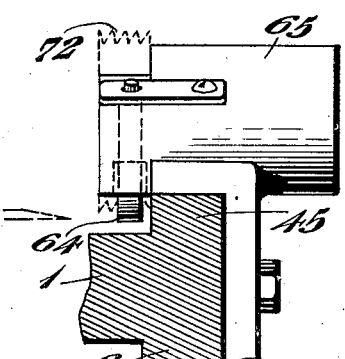

Apr. 24, 1923.  
J. F. DUGAN  
1,453,042  
PROCESS AND MACHINE FOR MAKING RANDS  
Filed Aug. 26, 1922  
7 Sheets-Sheet 6
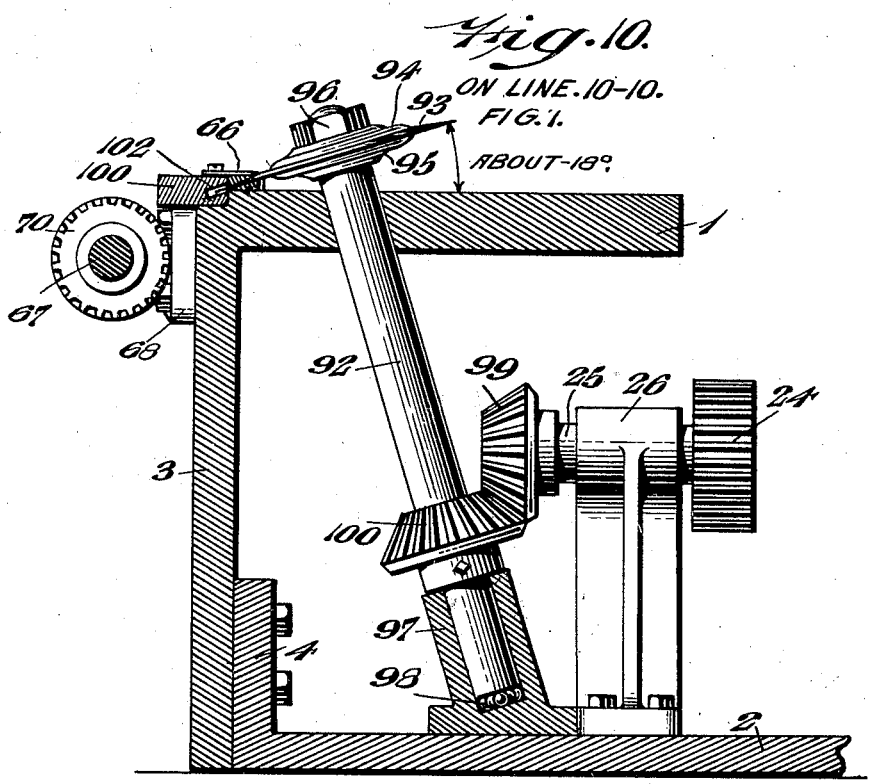
Fig. 10.
ON LINE. 10-10.
FIG. 1.
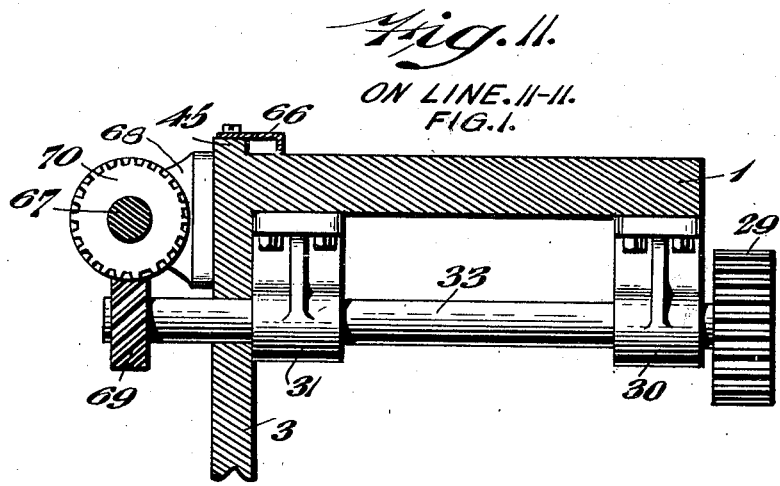
Fig. 11.
ON LINE. 11-11.
FIG. 1.
INVENTOR:
John F. Dugan,
BY
ATTORNEYS.

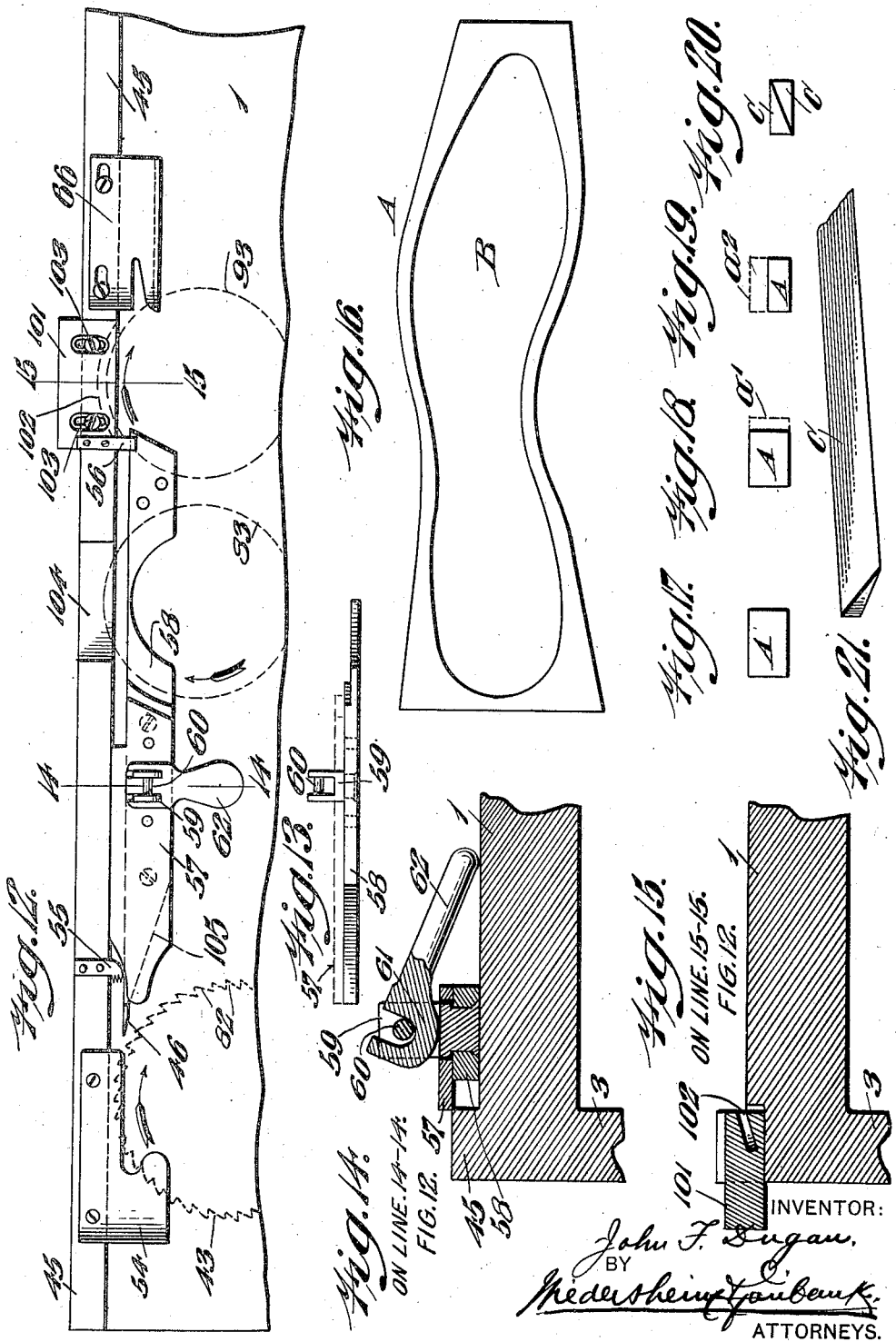

Patented Apr. 24, 1923.

1,453,042

UNITED STATES PATENT OFFICE.

JOHN F. DUGAN, OF PHILADELPHIA, PENNSYLVANIA, ASSIGNOR TO LAIRD, SCHOBER AND CO., OF PHILADELPHIA, PENNSYLVANIA, A FIRM.

PROCESS AND MACHINE FOR MAKING RANDS.

Application filed August 26, 1922. Serial No. 584,402.

*To all whom it may concern:*

Be it known that I, JOHN F. DUGAN, a citizen of the United States, residing in the city and county of Philadelphia, State of Pennsylvania, have invented a new and useful Process and Machine for Making Rands, of which the following is a specification.

My invention relates to the art of boot and shoe making, and its primary object is the making of rands, but particularly insole rands, by the utilization of the outlying or encompassing strip which is the surrounding margin of a block stock, being either an insole block, or an outsole block, that remains after the insole or outsole has been cut or struck from said block stock.

In the manufacture of boots and shoes, the insole rands have ordinarily been made from the stock or hide which is principally used for the making of welts, or from material utilizable as well for other purposes.

This encompassing strip has heretofore been regarded as a waste product of such negligible value as to be called in the shop "offal," and, obviously, its commercial utilization as a substitute for similar material bought by the yard and assumedly cut from the whole hide, stock or welting leather, has real value.

It is, in fact, self-evident that the utilization of material of no practical value, such as the offal strips, whether of the insole or the outsole blocks, possesses an economic value as against the otherwise necessary utilization of material having a market value.

With the foregoing and other objects in view, my invention, broadly considered, comprehends both the process and the machine hereinafter described and illustrated.

In the practice of my process, the offal strip of a block stock is subjected on one machine to an operation the steps of which are:—first, continuous feeding forward of the strip against a guiding device or guideway;—second, cutting off vertically and longitudinally the near side of said strip into parallelism with the distant side, which latter is continuously pressed, held and fed forward against the guide;—third, cutting off horizontally the top portion of the strip, to render uniform and level the usual variations in the thickness of the stock, and expelling it from the machine;—and, fourth, cutting obliquely the strip, then of the definite desired depth and width, into two beveled strips or rands of equal cross-section at all corresponding points, irrespective of variations in the thickness of the original offal strip, and expelling the rands from the machine.

My machine embodies operative instrumentalities of a more or less organic character which performs the steps of the foregoing process and which respectively unite in featuring, and are united as features of, the foregoing operation.

Thus, the first organic feature of my machine is the means which continuously press an end of the offal strip against a continuous guide-way and feed its continuous length forward until the strip as an entirety has been subjected to all of the operations of the other features or operative elements of the machine.

Thus, again, the second organic feature of my machine is the means by which one side of the offal strip, which is the near side or that not directly pressed against the guide-way, is cut vertically off the strip in parallelism with the opposite side which is pressed against the guideway, so as to reduce and make uniform the width of the strip.

Thus, again the third organic feature of my machine is the means by which the top or flesh side surface of the strip, then of definite width, is cut off horizontally, or in a plane parallel with the plane of the grain or underside of the strip, to reduce and uniformly define its depth without regard to the variations in the thickness of the stock.

Thus, finally, the fourth organic feature of my machine is the means by which I divide the offal strip, then of given width and depth, into two beveled strips or rands preferably of equal cross-section, the cut which makes them extending diagonally from corner to corner of the strip.

In combination with the foregoing elemental means I provide supplemental feeding means intermediate of the means which initially press and feed the strip and the means which terminally divide the strip obliquely into the two rands.

All of the foregoing necessary elements, although fundamental or organic, may be of modified construction or other than those depicted in the illustrative drawings and hereinafter described, but all of them, whatever may be their specific constructions, are adapted and intended to be assembled in one machine and to be operated simultaneously by driving means, a preferred, although not a necessary, form of which is likewise illustrated and described.

For the purpose of illustrating my invention, I have in the accompanying drawings represented and hereinafter I describe a preferred but typical embodiment of a machine adapted to effect the practice of my process and itself to operate upon the offal strip to form it into two sectionally corresponding rands of triangular cross-section.

It is to be understood, however, that various changes in the form, proportions, dimensions and minor details of the machine as an entirety, may be made without departing from the spirit of the invention or sacrificing any of its advantages.

The present invention, therefore, so far as it relates to the essential features which the machine embodies, is not limited to the special structural details of the elements, and this is because in its broader aspects the present invention may be embodied in other structural forms.

In the drawings,—

Figure 1 represents a top plan view of a machine embodying my invention and adapted to practice my process.

Figure 2 represents a front elevation of the machine of Figure 1.

Figure 3 represents an end elevation of the machine of Figures 1 and 2, viewed from the left-hand end of both figures and viewed through the machine without the removal of any parts and so as to show all of such parts as appear from the end view.

Figure 4 represents a transverse section on the line 4—4 of Figure 1, delineating only such parts as appear in the vertical plane of said line 4—4, the parts beyond being for clearer view omitted. This view is for the purpose of illustrating the mounting of the presser feed disk 43.

Figure 5 represents in transverse section on the line 5—5 of Figure 1, a broken detail of the vertical cutting knife or cutter 46, which cuts off the right-hand side of the offal strip as it passes through the machine, and also of one of the feed rollers 71, which occasion the continuous advance of the offal strip.

Figure 6 represents in elevation a detail of the vertical knife or cutter also shown in Figure 5, removed from the machine.

Figure 7 represents a transverse section on the line 7—7 of Figure 1, delineating only such parts as appear in the vertical plane of said line 7—7, the parts beyond being for clearer view omitted. This view is for the purpose of illustrating the mounting of the horizontal cutter 83 which shaves off the upper portion of the offal strip.

Figure 8 represents a fragmentary detail on the line 8—8 of Figure 1, illustrating in particular the mounting of the presser foot 64 and its carrier 65 with relation to the guideway 45.

Figure 9 represents a section on the line 9—9 of Figure 8, of the parts illustrated in said Figure 8 and particularly the form of the carrier 65 of the presser foot.

Figure 10 represents a transverse section on the line 10—10 of Figure 1, delineating only such parts as appear in the vertical plane of said line 10—10, the parts beyond being for clearer view omitted. This view is for the purpose of illustrating the mounting of the obliquely or angularly disposed cutting disk 93 which performs the operation of the division of the offal blank into two symmetrical portions which are counterpart rands.

Figure 11 represents a transverse section on the line 11—11 of Figure 1. This view illustrates a convenient means for imparting rotation to the feed shaft 67.

Figure 12 represents a broken plan of the guideway and its adjuncts, and illustrates in such adjuncts a co-acting means for maintaining the offal strip against buckling and firmly against the guideway during its passage through the machine and while subjected to the influence of the operative cutting elements of said machine.

Figure 13 represents an elevational detail of the rest plate 58 and cover plate 57 which form a section or length of the guideway of the machine.

Figure 14 represents a transverse section on the line 14—14 of Figure 12,—through said rest plate and cover plate, illustrating a cam means for holding the cover plate to duty upon its rest plate.

Figure 15 represents a transverse section on the line 15—15 of Figure 12, of the removable guard plate 101 of the guideway, and its arcuate groove 102 into which a segment of the periphery of the oblique cutting disk 93 enters.

Figure 16 represents a plan of such a typical offal strip A as remains after an insole designated B, has been cut or struck out from an insole block, which latter is to be understood as being illustrated by the entire figure which includes both insole and strip.

As stated, a principal purpose of my invention is to utilize this offal strip, a waste product, in the formation of rands.

Although, as stated, I can utilize the offal strip of the outsole, I have illustrated only the insole strip.

Figures 17, 18, 19 and 20 represent typical and, without regard to changeable dimensions, transverse sections through an offal strip, from the initial to the final operations performed upon it.

Figure 21 represents in perspective one of the two rands produced by the practice of my process on the machine hereinafter described.

Similar numerals of reference indicate corresponding parts.

Referring to the drawings:—

1 represents the bed or table of the machine, 2 the base, 3 the back of the base and bed, 4 a connecting plate between the base and back, 5 a front brace and 6 a rear brace,—all of which compose a convenient frame-work.

Upon the bed or table, the offal strip to be operated upon, designated "A" and typically illustrated in Figure 16, is introduced, preferably grain side downward, from the left-hand end of the machine as such end is illustrated in Figures 1 and 2, beneath the entering safety guide 54, with the outside edge of the strip against the guide 45.

The driving mechanism.

A convenient means for driving the operating elements is the following:—

7, see Figures 1, 2, 3 and 7, designates the main driving shaft, mounted transversely of the machine in bearings 8 and 9, provided, conveniently, with fast and loose pulleys 10, and preferably intermediately of its bearings, provided with a driving pinion 11.

This driving pinion operates through a train of pinions, see Figures 1 and 2, of which 12, 13 and 14 are idlers respectively mounted in bearings 16, 17 and 18,—12 being in mesh with the driving pinion 11, and 14 in mesh with the driven pinion 15, being a spur wheel mounted upon a cross shaft 19, see Figure 4, supported transversely of the machine in bearings 20 and 21, see Figure 3.

Through the train of gearing thus far described, the means for initially feeding and pressing the offal strip against the guideway, embodied in the presser feed disk 43, as later on described, are operated.

Referring again to Figures 1 and 2,—22 is an idle pinion in mesh with the driving pinion 11, mounted in a bearing 23 in the rear brace 6; and 24 is a driven pinion mounted on a shaft 25 in a bearing 26, see Figure 10, which engages with an idle pinion 27 mounted in a bearing 28 in a standard 32 erected from the base of the frame-work.

This idler pinion 27, in mesh as explained with the driven pinion 24, is also in mesh with another driven pinion 29, see Figure 11, mounted in bearings 30 and 31 depending from the bed, and on a shaft 33, the function of which pinion 29 is to operate the feed rollers, as later on explained.

The initial presser and feed.

The first step of the operation which my process involves is performed by a device for feeding the advanced end of the offal strip as laid on the top of the table, conveniently beneath an entering safety guide 54, against a continuous fixed guideway 45, preferably of the length of the bed,—such device being especially illustrated in Figures 1, 2, 3 and 4, and being a presser feed disk 43, the circumference of which is provided with teeth 82, preferably similar to those of a circular saw and preferably facing backwardly, but which may be simply a roughened surface.

The mounting and rotating of this presser-feed-disk 43 is best illustrated in Figure 4, in which it will be observed that the inner end of the cross-shaft 19 is provided with a bevel driving pinion 34 in mesh with a bevel driven spur wheel 35, fixed on a bevel gear shaft 36 vertically mounted in a lower bearing 37 and an upper bearing 38.

At its upper end the shaft 36 is provided with a bevel pinion 39 in mesh with a counterpart bevel pinion 40, mounted upon the upper end of the presser feed shaft 41, which itself is mounted in an oblique bearing 42, and at its lower end is provided with the presser feed disk 43 which is locked to it by the nut 44, and, as will be observed, occupies with relation to the horizontal upper-face plane of the table 1, an inclination preferably of 45°.

Obviously, from and through the train of idle pinions 12, 13 and 14 from the driving pinion 11 to the driven spur wheel 15, and through the cross shaft 19, the lower bevel gear 34—35, the bevel gear shaft 36, the upper bevel gear 39—40 and the shaft 41,—the presser feed disk 43 and the connective means will be driven in the direction represented by the arrows.

The strip guiding and retaining means.

As already mentioned, 45 designates a guide way, or edge gage, being conveniently a piece of metal formed upon or applied to the back of the bed, and extending the length of said bed and above its level.

Obviously, as Figure 4 particularly illustrates, the outer face of this guideway, which is vertical, forms with the inner upper face of the bed, which is horizontal, a right-angular recess, so to speak, against which the outside edge of the offal strip, when introduced preferably, as explained, beneath an entering and overhanging safety guide 54, is forced inward, downward and forward by the rotary movement of the presser feed disk 43.

For the retention of the strip against buckling upwardly, I preferably provide a holding guide 55 conveniently secured to the top level of the guideway, as illustrated in Figure 12.

A second holding guide 56 is also illustrated in Figure 12 and preferably supplements the action of the holding guide 55, both overlying and pressing down upon the upper level of the strip as it passes along the bed.

Between the holding guides 55 and 56 is a continuously extending strip guide 57, which overlies and is really a cover plate of a rest plate 58, see Figures 12, 13 and 14, and which by extending inwardly and against the guideway 45 overlaps the strip and of course prevents its buckling.

This strip guide cover-plate 57 may, obviously, be mounted upon the bed in many ways. As a convenient means for applying it and removing it for the cleaning of the guideway channel, I connect with the rest plate 58 a fulcrum block 59 which passes through the cover plate as illustrated in Figure 14, and embodies a fulcrum pin 60, which coacts with a slotted cam 61, the cam surface of which bears upon the base of the channel through the fulcrum block and is extended as a cam handle 62, so that, as will be apparent from Figure 14, this cam device according to its position, will either clamp down the cover plate 57 or release it so that it can be lifted off.

The entire contrivance is one of convenience, and such fastening screws and dowel pins as are shown in Figure 12, and for clearness of view not lettered, will answer the same purpose.

Mentioning it out of its order,—63 designates a curve-ended chute over and through which the top layer of the strip, after such layer has been cut from the body of the strip, as hereinafter described, is delivered out of the machine, the delivery being aided by a presser foot 64, see Figures 8 and 9, which being over the radially extending and downwardly inclined upper circumference of a rotary flat disc knife 83, hereinafter described, aids in the direction of said top layer away from and off the bed, while at the same time continuing the pressure upon the body of the strip in its further passage through the machine.

This presser foot is a device of convenience, preferably mounted in a carrier 65 attached to the bed, and locked in place in said carrier to the rear of the feed roller 72, whereof hereinafter.

The last of the elements of the strip-guiding means or guideway, is an overhanging delivery guide 66, see Figures 1 and 12, which may be of any preferred construction and a function of which is to permit of the discharge of the two rands into which the offal strip is ultimately divided.

The vertical cutting mechanism.

An end of the offal strip having been laid upon the bed and being manually forced forward under the entering safety guide 54 against the guideway 45 until it comes under the periphery of the presser feed disk 43, it is necessary, inasmuch as the strip, as shown in Figure 16, is of irregular widths, to cut its inner side vertically to a width which will uniformly parallel its vertical outer side as forced forward and held continuously against the guideway.

The device which I preferably employ for this purpose is a vertical knife, especially illustrated in Figures 4, 5, 6 and 12, the cutting edge 46 of which extends laterally from the upper end of a shank 47, which latter is adapted to be dropped into a vertical slot 48 in the bed,—the cutting edge 46 of the knife facing forward toward the presser feed disk 43, and extending to below the level of the bed, and being, as illustrated in Figure 12, so close to the periphery of said disk that the offal strip without chance of buckling is forced and held against the guideway.

In order conveniently to retain this knife fixedly within its slot, I provide a presser pin 49, fitted within an aperture 50 transversely formed in the bed, as shown in Figure 5, and adapted to be held to duty against the side face of the shank 47 of the cutter, by a cam shaft 51 fitting within a longitudinally-extending shaft-socket 52 in the bed, and extended beyond the left-hand end of the bed where it is provided with a crank handle 53, see Figure 3, which controls its rotating to tighten or release the pressure pin. The side strip as cut off encounters an angular throw-off 105, see Fig. 12, which throws it laterally from the machine.

The strip feeding mechanism.

In order continuously and steadily to advance the offal strip along the guideway to its ultimate delivery in the form of two rands from the machine, I employ a plurality of feed rollers,—in the illustration three—71, 72 and 73, see Figures 1 and 2, mounted in bearings 74, 75 and 76, and actuated through connective mechanism by a feed shaft 67 mounted in bearings 68 at the ends of the framework of the machine. This feed shaft conveniently derives its rotation from the cross-shaft 33, see Figure 11, already described as being driven from the pinion 29.

This cross shaft 33 upon its rear end is provided with a bevel pinion 69 in mesh with a counterpart bevel pinion 70 on the feed shaft.

Referring first to feed roller 71, see Figures 1, 2 and 5, this roller, like its counterpart rollers 72 and 73, is preferably designed to be of a peripheral breadth equal to the width of the offal strip A, Figures 17 and 18, when its inner side $a'$ has been cut off by the vertical knife 46,—and each of said rollers is similarly peripherally-toothed or roughened, see Figures 5, 8 and 9, to grip the upper surface of the offal strip and insure its steady and continuous forward travel along and against the guideway 45.

Each of these feed rollers is similarly driven by a similar bevel gear connected with the feed shaft 67.

Referring, for explanation of one of these preferred connections, first, to feed roller 71, see Figure 5, it is mounted on a shaft 78 in a bearing 74, the outer end of the shaft having a typical bevel gear 80 in mesh with a counterpart bevel gear 79 on the shaft 67.

Referring, further, to feed roller 72, the second of the series, see Figures 1 and 2, the typical bearing 68 in which this roller is mounted is illustrated in Figures 7 and 11, and is bracketed from the back 3 of the frame-work. The roller itself is driven by a bevel pinion on the feed shaft 67, which is in mesh with a bevel gear on its own shaft, the bevel gearing as a whole being identical with the bevel gears that drive the feed roller 71 and also the third of the rollers 73 of the series.

Obviously, other means of simultaneously driving the counterpart feed rollers of the series, may be resorted to.

*Means for cutting off and expelling the top portion of the offal strip.*

Referring now to Figures 1, 2 and 7,—83 is a horizontally disposed, rotary disk knife, flat, except as to its inclined upper outer periphery, as already described, conveniently mounted by clamping plates 84, 85, on a vertical shaft 86, which is itself rotated to rotate said flat disk by a bevel gear 87 on the main drive shaft, in mesh with a counterpart gear 88 on said vertical shaft. The lower end of the shaft 86 is stepped in a base bearing 89, which, for convenience, preferably embodies a ball bearing 90, and the flat knife 83 is held upon the shaft 86 between its clamping plates 84 and 85 by a clamping nut 91.

In Figures 1 and 12, the rear segmental edge of this flat cutter 83 is shown as passing into an arcuate slot 104 channeled in guideway 45. This is for the purpose of enabling this flat cutter to cut off and free the upper portion $a^2$ Figure 19 of the offal strip A before it passes into the chute 63 in a manner and for a purpose already explained.

*Means for effecting the diagonal cut in the offal strip.*

Referring now to Figures 1, 2, 3, 10 and 12,—93 designates a dividing cutting disk, preferably mounted between clamping plates 94 and 95 upon an angularly mounted shaft 92, see Figure 10.

A clamping nut 96 holds this cutting disk in place between its clamping plates, and the shaft 92 is preferably stepped in a diagonal bearing 97 in the base of the machine, a ball bearing 98 being illustrated.

The rotation of this shaft 92 is conveniently effected through the bevel pinion 99, mounted on the cross shaft 25, and in engagement with a counterpart bevel pinion 100 mounted upon said shaft 92.

In Figure 15 will be observed in cross-section a part of the bed or table 1 and its back 3, and also a removable guard plate 101 which forms a continuation of the guideway for the strip.

In this plate 101 is an arcuate slot 102 into which passes the inner segment of the cutting disk 93, which is illustrated as disposed at an angle typified in the drawings as of 18°, in order that in the severance of the strip cut to the proportions illustrated in Figure 19 with the upper layer $a^2$ cut off, said strip may be divided or split diagonally into two symmetrical portions, which are two rands C C, as illustrated in Figures 20 and 21, one of these rands being illustrated in broken perspective in said Figure 21.

Of course, the inclination of this obliquely-disposed cutter 93 may be other than of an 18° pitch, but I find it preferable to use that angular disposition because it enables me to make a very desirable form of rand—that shown in Figure 21—which may be and is produced from an offal strip initially of considerable irregularity in vertical depth.

In Figures 17, 18, 19 and 20,—which, as already explained, are merely cross-sections of a typical offal strip at different stages of my operation upon it to convert it into rands,—the dimensions of vertical depth and of horizontal width of the strip, are not, of course, the only dimensions possible, but, with the cut off side strip $a'$ shown in dotted lines in Figure 18, reducing the width of the strip first cut by the vertical knife 46 to that shown in full lines in Figure 18, and with the dotted line top strip $a^2$ of Figure 19, also cut off, there is left in the full line dimensions shown in Figure 20, a reduced strip of such cross sectional size as will permit of the oblique cutting of said strip so reduced, into the obliquely divided counterpart triangular forms C C of rands shown in Figure 20.

The removable guard plate 101, as will be observed from Figures 1, 12 and 15, is so proportioned as to fit, fill in and form a continuance of the strip guide 45, and is removably attached to the framework of the table by such fastenings as 103, which make it possible to take it off when desired for the cleaning of the gutter of the guide, should the latter become clogged.

Having now described the objects of my invention and my process for utilizing the offal strip or waste product resulting from the cutting or stamping of a block stock, by the operation of a good form of machine illustrated in the drawings, and by the use of which I have successfully practiced the process and made rands,—it will not be necessary to redescribe the operation of the machine as step by step it carries out my process, because in the description of the machine and its elements, I have explained both the construction and the operation of said elements, as, one by one, in their preferred sequence, they carry out the process.

Having thus described my invention, what I claim as new and desire to secure by Letters Patent, is:—

1. The process of making rands from the offal strip of a block stock, which consists:— first, in introducing, pressing and feeding forward an offal strip into and along a guiding device or guideway;—second, while the strip is being fed forward along the guideway, cutting off its near side and expelling said near side laterally from the machine;—third, under similar conditions of feeding, cutting off the top portion of the strip and expelling said top portion from the machine;—and, fourth, under similar conditions of feeding, cutting the strip after being reduced in both width and depth into two strips or rands.

2. The process of making a pair of rands from an offal strip cut or struck from a block stock,—which consists in introducing an end of the strip into a guide;—then feeding the strip forward while pressed against the guide;—then, under similar conditions of feeding and pressure, cutting off a side of the strip to make said strip of uniform width and, cross-sectionally, parallel-sided and expelling said side of the strip laterally from the machine;—then, under similar conditions of feeding and pressure, cutting off the upper portion of said strip to reduce its depth;—and, finally, under similar conditions of feeding and pressure, dividing the strip so reduced in both width and depth into two strips or rands of opposite cross-section.

3. The process of making rands from the offal strip of a block stock, which consists:—first, in introducing and continuously pressing and feeding an offal strip into and along a guiding device or guideway;—second, while the strip is being pressed and fed forward against and along the guideway, in cutting off vertically and longitudinally and expelling from the machine the near side of said strip while continuously pressing and holding said strip in parallelism with the guideway;—third, under similar conditions of pressure and feeding, in cutting off horizontally and laterally expelling from the machine the top portion of the strip;—and, fourth, under similar conditions of pressure and feeding, in cutting the strip so aforesaid reduced in both width and depth, into two strips or rands of opposite cross-section.

4. In a machine for making rands from the offal strip of a block stock, the following elements in combination:—an angularly-disposed pressing and feeding disc which both presses one side of the stock against a guideway and continuously feeds the stock forward,—a vertical cutter in adjacency to the operating edge of the angularly-disposed pressing and feeding disc, which in the advance of the strip cuts off its near side into parallelism with the side pressed against the guideway,—a horizontal cutter which in the advance of the strip cuts off its top portion into parallelism with its under portion,—an oblique cutter for obliquely dividing the strip so as aforesaid reduced in both width and depth, into two strips or rands of opposite cross-section,—a guideway with respect to which the foregoing operative elements are mounted,—and means for operating said elements simultaneously with relation to each other and to said guideway.

5. In a machine for making rands from the offal strip of a block stock, the following elements in combination:—an angularly-disposed pressing and feeding disc which both presses one side of the stock against a guideway and continuously feeds the stock forward,—a vertical cutter in adjacency to the operating edge of the angularly-disposed pressing and feeding disc, which in the advance of the strip cuts off its near side into parallelism with the side pressed against the guideway,—means for laterally expelling said cut off near side of said strip from the machine,—a horizontal cutter which in the advance of the strip cuts off its top portion into parallelism with its under portion,—an oblique cutter for obliquely dividing the strip so as aforesaid reduced in both width and depth, into two strips or rands of opposite cross-section,—a guideway with respect to which the foregoing operative elements are mounted,—and means for operating said elements simultaneously with relation to each other and to said guideway.

6. A machine for making rands from the offal strip of a block stock, in which are combined:—means for continuously pressing and feeding forward against and along a guiding device or guideway an offal strip;—a guideway;—means for cutting off in a plane parallel with that of its opposite side the near side of the strip while the latter is being pressed against and advanced along the guideway and expelling laterally from the machine said near side;—means for cutting off and expelling from the machine a uniform top portion of the strip;—and means for obliquely dividing the strip so as aforesaid reduced in both width and depth, into two strips or rands of opposite cross-section.

7. A machine for making rands from the offal strip of a block stock, which comprises the following elements in combination:—means for continuously pressing and feeding forward against and along a guiding device or guideway an offal strip;—a continuous straight-surfaced guideway;—means for cutting off in a plane parallel with that of its opposite side the near side of the strip while the latter is being pressed against and advanced along the guideway;—means for cutting off to a uniform depth the top portion of the strip;—and means for obliquely cutting the strip reduced in both width and depth into two strips or rands of opposite cross-section.

8. A machine for making rands from the offal strip of a block stock, in which are combined:—means for continuously pressing and feeding forward against and along a guiding device or guideway an offal strip;—a guideway;—means for cutting off in a plane parallel with that of its opposite side the near side of the strip while the latter is being pressed against and advanced along the guideway, and throwing off said near side;—means for cutting off and expelling from the machine the top surface of the strip;—means for obliquely dividing the strip so as aforesaid reduced in both width and depth, into two strips or rands of opposite cross-section;—and supplemental feeding-means for feeding the strip between the initial pressing and feeding-means and the final means for obliquely cutting it into the two rands.

9. A machine for making rands from the offal strip of a block stock, which comprises the following elements in combination:—means for continuously pressing and feeding forward against and along a guiding device or guideway an offal strip;—a continuous straight-surfaced guideway;—means for cutting off in a plane parallel with that of its opposite side the near side of the strip while the latter is being pressed against and advanced along the guideway;—means for cutting off the top surface of the strip;—means for obliquely cutting the strip reduced in both width and depth into two strips or rands of opposite cross-section;—and supplemental feeding-means acting conjointly with the means for both continuously pressing and feeding forward, for forcing the strip along the guideway.

10. A machine for making rands from the offal strip of a block stock, which comprises the following elements in combination:—means for continuously pressing and feeding forward against and along a guiding device or guideway an offal strip;—a continuous straight-surfaced guideway;—means for cutting off in a plane parallel with that of its opposite side the near side of the strip while the latter is being pressed against and advanced along the guideway;—means for cutting off the top surface of the strip;—means for obliquely cutting the strip reduced in both width and depth into two strips or rands of opposite cross-section;—supplemental feeding-means acting conjointly with the means for both continuously pressing and feeding forward, for feeding the strip along the guideway;—and means for holding the strip in place against, and throughout its travel along, the guideway.

In testimony that I claim the foregoing as my invention, I have hereunto signed my name this 25th day of August, 1922.

JOHN F. DUGAN.

In the presence of—
J. BONSALL TAYLOR,
C. D. McVAY.